United States Patent
Hanhikoski

Patent Number: 5,589,388
Date of Patent: Dec. 31, 1996

[54] HOT-COMPOSTING APPARATUS

[76] Inventor: Esko Hanhikoski, Leipurintie 9, FIN-00620 Helsinki, Finland

[21] Appl. No.: 256,919
[22] PCT Filed: Jan. 29, 1993
[86] PCT No.: PCT/FI93/00028
§ 371 Date: Jul. 29, 1994
§ 102(e) Date: Jul. 29, 1994
[87] PCT Pub. No.: WO93/15033
PCT Pub. Date: Aug. 5, 1993

[30] Foreign Application Priority Data

Jan. 30, 1992 [FI] Finland ................................ U920086

[51] Int. Cl.⁶ ............................................. C05F 9/02
[52] U.S. Cl. ..................... 435/290.3; 366/235; 220/287
[58] Field of Search ........................... 435/287, 289, 435/290, 313, 315, 316, 312, 819, 290.1, 290.3, 290.2; 422/184, 209; 366/219, 220, 233, 235, 236; 220/287; 71/9

[56] References Cited

U.S. PATENT DOCUMENTS

| | | | |
|---|---|---|---|
| 913,399 | 2/1909 | Kilpatrick | 366/235 |
| 1,655,144 | 1/1928 | Hallgarth et al. | 366/235 |
| 1,721,132 | 7/1929 | Orthwine | 220/287 |
| 3,837,810 | 9/1974 | Richards et al. | 422/184 |
| 3,966,415 | 6/1976 | Chester | 422/184 |
| 5,292,637 | 3/1994 | Bohnensieker | 435/312 |

FOREIGN PATENT DOCUMENTS

| | | | |
|---|---|---|---|
| 2030574 | 5/1992 | Canada | 435/312 |
| 0210382 | 2/1987 | European Pat. Off. | 435/312 |
| 3626480 | 9/1987 | Germany . | |
| 4000916 | 7/1991 | Germany . | |
| 0680364 | 8/1992 | Switzerland . | |

Primary Examiner—William Beisner
Attorney, Agent, or Firm—Merchant, Gould, Smith, Edell, Welter & Schmidt, P.A.

[57] ABSTRACT

The invention relates to an apparatus for composting organic leavings in small-scale households etc. According to the invention the apparatus includes a rotating drum (1, 2, 6) with an adjustable partition wall and adjustable cover, by means of which the leavings can be properly mixed which is a presupposition for microbe activity in the mass to be composted.

9 Claims, 2 Drawing Sheets

5,589,388

HOT-COMPOSTING APPARATUS

FIELD OF THE INVENTION

The present invention concerns a hot-composting apparatus meant for small-scale households and to be used out doors including a drum with an internal composting space, the drum can be opened and closed for charging the drum with mass to be composted and/or removing the mass, and the drum comprises a heat isolated casing wall having a form of a polygon and heat isolated gable walls, from which the drum is supported onto any suitable support frame for rotation around its geometric longitudinal axis.

BACKGROUND OF THE INVENTION

A composting apparatus of this kinds is previously illustrated in the published EP patent application 210 382 and in U.S. Pat. No. 3,966,415. Disadvantages of constructions according to these publications are among other things, the their use in winter, when availability of refuse other than household refuse is decreased is very difficult, because the drum includes just one single department and the drum walls are air penetrable in a remarkable extent, therefore there is inside the drum an unnecessary large air space and an unnecessary high air ventilation, which in a combination tend to decrease the internal temperature of the apparatus, whereby there is a risk of total standstill of the composting process.

SUMMARY OF THE INVENTION

The object of the present invention is to eliminate disadvantages of the known composting apparatuses and to provide an improved composting apparatus. Especially the object of the present invention is to certify a continuous composting process during all seasons.

According to the present invention these objects have achieved with the composting apparatus mentioned in the beginning, the said apparatus having a combination of characterizing features below:

the casing and gable walls are essentially air-tight and heat isolated, advantageously of sandwich-construction, at least one of, more preferably both of the gable walls includes an openable and closeable air defile for conveying air to be needed for maintaining microbe actions into the composting space, in the composting space there exists at least one intermediate wall unit, which has a form corresponding substantially the polygonal form of the drum, and which divides the drum into departments in a plane, which is essentially perpendicular in relation to its geometric longitudinal axis, the intermediate wall unit is composed of at least one heat isolated wall element intermediate wall element, which can be shifted in a direction of the geometric longitudinal axis of the drum to any optional distance from the fixed gable walls, and which is perforated or provided with an optional amount of air defiles for conveying air therethrough from one composting department into another, possibility to open and close the drum is accomplished by means of a cover in two parts, which cover substantially forms one section of the casing wall, and widths of parts of the cover in the direction of the geometric longitudinal axis of the drum are selected, such that the adjacent edges of the cover parts meet the intermediate wall unit.

According to one advantageous embodiment of the present invention there exist below one of the two cover parts moveable plate elements, their amount corresponding to the amount of moveable intermediate walls, a free edge of the said plate element is meant to be positioned such that it meets the edge of the intermediate wall shifted to an optional location between the fixed gable walls.

BRIEF DESCRIPTION OF THE DRAWINGS

The invention is described In the following in an exemplatory way more precisely by means of one advantageous embodiment thereof with reference to the accompanying drawing, wherein.

DESCRIPTION OF THE PREFERRED EMBODIMENT

Figure 1:
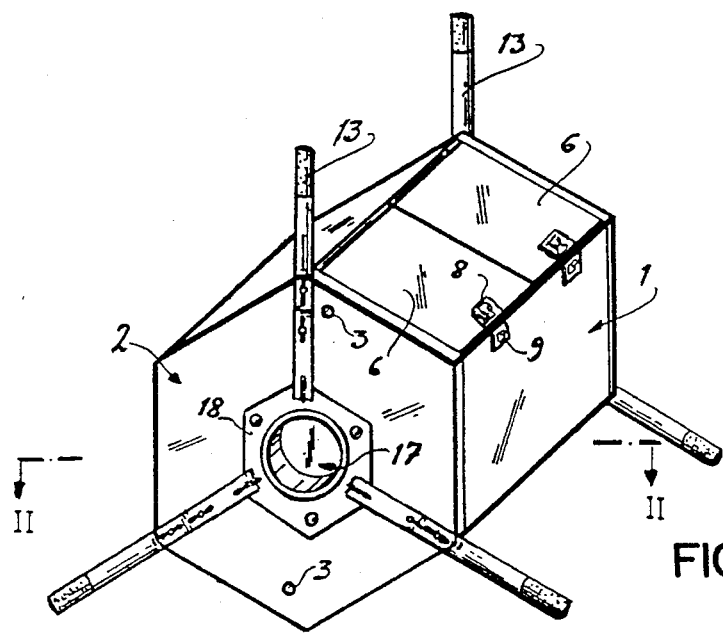
FIG. 1 illustrates in general a perspective view of the drum of the composting apparatus.

As can be seen from FIG. 1 the composting apparatus include the drum 1,2 having a openable as well as closeable cover 6 in two parts for charging the drum with mass to be composted and/or for discharging the mass from there. Inside the drum exists the composting space 10,11,12, and the drum is composed of the casng wall 1 having a form of polygon and gable walls 2, from which the drum is supported for rotation around its geometric longitudinal axis. For rotation by hands the drum is provided detachable handles 13, which are placed, most preferably symmetrically, to optional locations at the gable wall (or gable walls) 2, and which extend radially from the drum. The handles can also be attached to the rotation shaft.

In accordance with the invention for preventing properly heat escape the casing and gable walls 1 and 2 are layer-constructed heat isolation walls and further substantially air-tight for preventing unnecessary air ventilation. In order to accomplish a controlled air ventilation in the composting space 10,11,12 at least each gable wall 2 of the drum is provided with 2 an openable and closeable air defile 3 for conveying air to be needed for the microbe function inside the composting space 10,11,12.

According to the preferred embodiment of the present invention there exist at least two pieces of the said air defiles 3 at the gable walls and they are located symmetrically advantageously with a distance between 5–15 cm, more preferably about 7 cm, from the outer periphery of the gable wall 2. In order to certify that the mass to be composted do not plug the air defile 3 it is preferred, that the air defiles are placed at the gable wall symmetrically at the line, which goes via the geometric rotation axis of the drum to the periphery of the drum adjacent to the pivot line of the cover.

The hot-composting apparatus has in practice two main utility positions, i.e. the covers 6 directly or in an oblique angle upwards or the covers 6 downwards, the rotable drum of hot-composting apparatus can be locked to either of the said positions. When the covers 6 are upwards it is easy to reach and get the composting space 10,11,12 of the hot-composting apparatus exposed for mass charging as well as for mass fluffing. In practice there are often situations, that the mass to be composted is wet, then for certifying removal of the excess humidity it is preferred to position the covers of the composting apparatus downwards, whereby the excess humidity or fluid may be drained out from the composting apparatus. When drain is heavy it is advantageous to position the drum covers 6 downwards.

Figure 4:
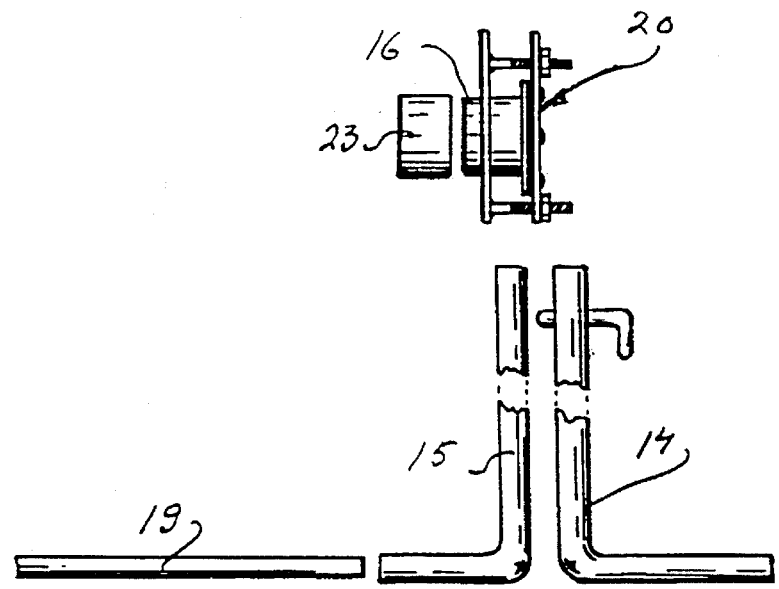
FIG. 4 illustrates as parts a support leg of the composting unit according to the invention and an interposing support for joining a pair of the support legs with each other.
Figure 5:
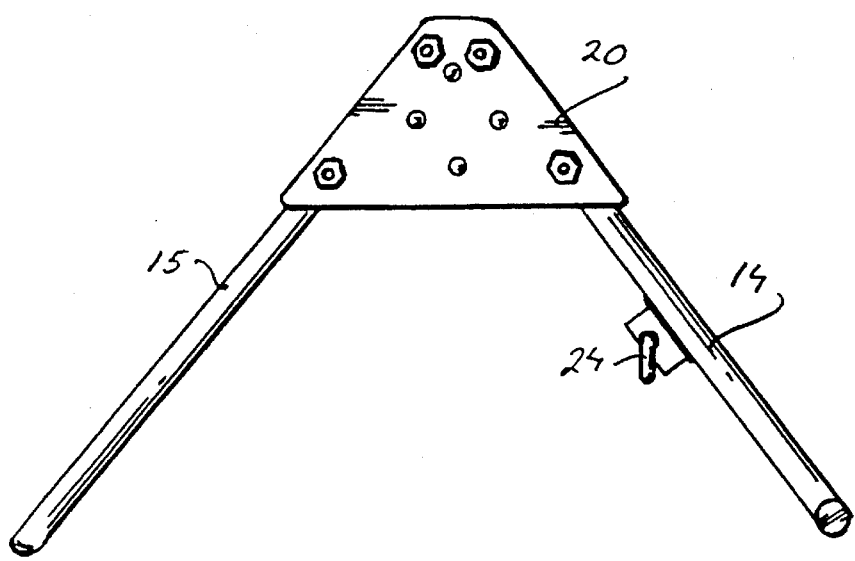
FIG. 5 illustrates as assembled one support leg of the composting unit according to the invention.

In the advantageous embodiment of the present invention the air defiles 3 are dimensioned to function as receiver holes for a locking pin 24 (see FIG. 4 and 5). The locking pin 24 is advantageously mounted to one of the two branch supports 14 of the supported frame for the rotable drum of the composting apparatus.

According to the advantageous embodiment of the present invention all walls of the drum are of sandwich-construction of a same type having air-tight outer and inner surface layers 21 and therebetween a heat isolating layer 22. Very preferably the heat isolating layer 22 is of closed-cell-plastic or polyuretan-foam and the surface layers 21 of metal or coated plywood or veneer.

In order to certify proper mixing of the mass by rotating the composting apparatus the drum has generally a form of a polygon, in the embodiment illustrated in the drawings the form is a hexagon, which form has discovered to be suitable also in practice.

In case an outer temperature decreases remarkably low it is preferred to produce heat into the composting space 10,11,12. Advantageously one may utilize an electric coil 30 or resistance adapted at one section of the casing wall 1 below the internal surface layer 21. In the FIG. 2 the heat coil or resistance is illustrated by dotted line. Further can be stated, that for increasing heat conductivity the casing section including the heating means 30 is preferably provided with a metal sheet especially in case the internal surface layer 21 is of blywood or a corresponding material.

Figure 2:
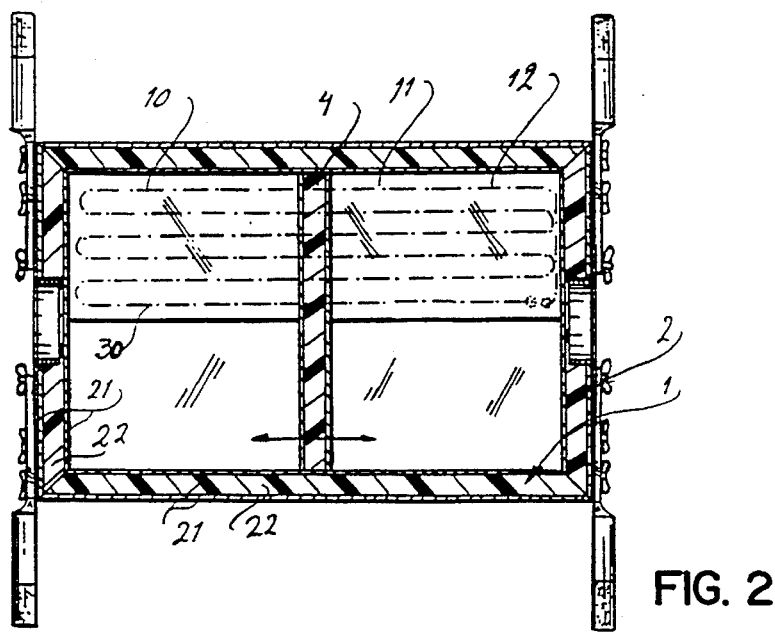
FIG. 2 is a cross-section view along line II—II of FIG. 1.
Figure 3:
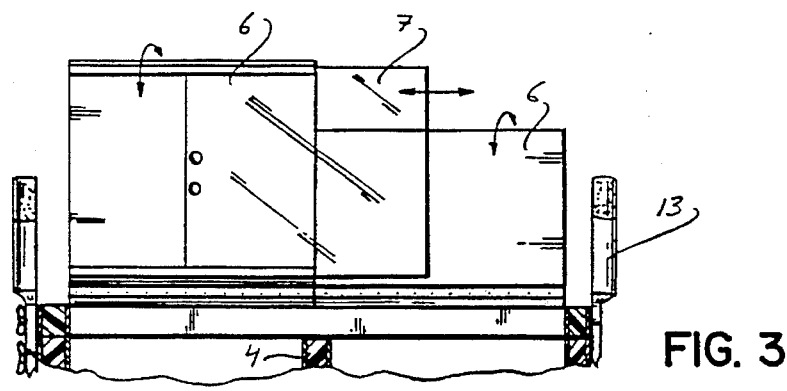
FIG. 3 illustrates a part of the drum of the composting apparatus as the cover open.

As illustrated in the FIG. 2 there exists in the composting space a movable intermediate wall unit 4, which divides the internal space of the drum into departments in a perpendicular plane in rotation to the direction of the drum's geometric longitudinal axis. The intermediate wall unit has a form corresponding essentially the polygonal form of the drum, whereby unnecessary shifting of mass from one department to another is prevented. The intermediate wall unit 4 can be shifted in the direction of the geometric longitudinal axis of the drum to any optional location between the fixed gable walls 2, alternatively the intermediate wall unit 4 can be removed from the drum. The intermediate wall unit 4 is perforated or provided with an optional number of air defiles for conveying air therethrough from one composting department to another.

As even mentioned above the possibility to open and close the drum is accomplished by the cover 6 in two parts. According to the preferred embodiment the cover 6 in two parts composes essentially one entire section of the casing wall. Further it is advantageous, that the widths of parts of the cover 6 in the direction of the geometric longitudinal axis of the drum are selected, such that the adjacent edges of the parts of the cover 6 meet the edge of intermediate wall unit 4.

In case more than one shiftable intermediate wall elements 4 are utilized, it is preferred for certifying easy mass discharging, that under one of the cover parts is provided shiftable plate elements 7 the number of which corresponds the number of intermediate wall elements 4. The free edges of the said plate elements 7 are meant to be positioned to meet the edges of the intermediate wall elements 4 shifted to optional locations between the fixed gable walls 2.

Because the drum can be rotated each part of the cover 6 is provided with means 8,9 for locking the same to a closed position. Further it is preferred to the cover parts means which hold the cover part at the open position. According to one advantageous embodiment the means for locking the parts of the cover 6 to the closed position are composed of bar means 8,9 and the means for holding the cover part at the open position are composed of clip means (not illustrated). Optionally the locking to the closed or open positions can be materialized by bar means, such that the locking bar 8 is at the cover part and the receiver parts 9 at the casing wall.

It is preferred to mount the composting apparatus according to the invention in bearings such that it is suspended rotably by the two branch supports 14,15, whereby the rotation shaft 16 can be attached to the core of the drum and the branch supports are provided with suspension sleeves for the said shafts. It is further preferred, that the branch supports are provided to an under support frame. In the FIGS. 4 and 5 is illustrated an alternative collapsible support unit, which as assembled may suspend the composting apparatus rotably. In this support unit the rotation shafts 16 are adapted to the support legs 14,15. As can be seen from the FIG. 1 the gable walls 2 of the drum are provided with core strengthening pieces including receiving spaces 17 for the drum rotation shafts 16. The locking pin 24 mentioned above is attached most preferably to one support leg 14 of the branch support, whereby it can easily by pushed inside the receiving opening at the gable wall 2 of the drum, i.e. inside an air defile 3 facing the locking pin.

In the embodiment illustrated in the FIGS. 4 and 5 the support legs are composed of a pair collapsible branch supports 14,15. The ends of first support legs of the branch supports are bent towards each other and are meant to be joined with each other by an interposing support 19. The second ends of the branch supports are bent apart from each other. At each of the branch supports the first and the second support leg are supported detachably to an oblique angle by an interconnecting piece 20 composed of a pair of triangular plates, between which are adapted and tightened the support legs 14,15. Further the interconnecting piece 20 supports the above mentioned rotation shaft 16 provided preferably with an overlapping slide sleeve 23 for facilitating the rotation movement of the drum.

The invention is illustrated above only in an exemplatory way and as it is evident to any skilled in the art several modifications and amendments as well as alternative constructive solutions are possible within the scope and spirit of the present invention defined in the accompanying claims.

I claim:

1. A hot-composting apparatus for household use comprising a drum having a geometric longitudinal axis, said drum comprising:

heat insulated casing wall having a polygonal form;

heat insulated gable walls, wherein the heat insulated casing walls and the heat insulated gable walls are constructed and arranged to provide an internal composting space, and the heat insulated gable walls are constructed and arranged to provide support for rotation about the geometric longitudinal axis of the drum;

an intermediate wall unit positioned in the composting space and which has a form corresponding substantially to the polygonal form of the drum, and which divides the drum into departments in a plane which is substantially perpendicular in relation to the geometric longitudinal axis of the drum, wherein the intermediate wall unit comprises at least one movable intermediate wall element which can be shifted in a direction along the geometric longitudinal axis of the drum to a location between the gable walls, and which is perforated to provide air defiles for conveying air from one composting department into another;

means for opening and closing the drum comprising a two part cover, which cover substantially forms one section of the casing wall;

shiftable plate elements provided under one part of the two part cover;

wherein the casing wall and the gable walls are substantially air-tight and heat insulated so that inner and outer surface layers are air-tight and a layer therebetween is heat insulated;

at least one gable wall includes an openable and closable air defile for conveying air in a sufficient amount to maintain microbe actions in the internal composting space; and widths of parts of the cover in the direction of the geometric longitudinal axis of the drum are selected such that adjacent edges of the parts of the cover meet the intermediate wall unit when the intermediate wall unit is positioned in the middle of the drum.

2. A composting apparatus according to the claim 1 wherein the casing wall and gable walls are of sandwich-construction and comprise substantially air-tight inner and outer surface layers and a heat insulated layer between the surface layers.

3. A composting apparatus according to 2 wherein the heat insulated layer is a closed cell plastic foam and the surface layers are selected from the group consisting of metal, coated plywood, and coated veneer.

4. A composting apparatus according claim 1 wherein the apparatus is provided with heat producing means comprising an electric resistance coil.

5. A composting apparatus according to claim 1 wherein each part of the two part cover is provided with means for locking to a closed position and for holding in an open position.

6. A composting apparatus according to claim 1 further comprising detachable handles placed at optional locations substantially symmetrically around the periphery of the drum and extending radically therefrom for rotating the drum.

7. A composting apparatus according to claim 1 further comprising a slide sleeve for facilitating rotation of the drum.

8. A composting apparatus according to claim 1 further comprising mounted rotatable rotation shafts suspended by support legs, wherein the gable walls of the drum are provided with receiving spaces for the rotation shafts or the drum rotation shafts extend from the gable walls so that the support legs provide an oblique angle with respect to each other, and one of the support legs is provided with drum locking means comprising a locking pin for insertion into an air defile.

9. A composting apparatus according to claim 1 wherein at least one section of the casing wall includes means for producing heat into the composting space.

* * * * *